US012794848B2

(12) United States Patent
Shams et al.

(10) Patent No.: US 12,794,848 B2
(45) Date of Patent: Nov. 10, 2026

(54) TRANSFORMER-BASED MESSAGE PRIORITIZATION

(71) Applicant: Zoom Communications, Inc., San Jose, CA (US)

(72) Inventors: Hengameh Shams, Redwood City, CA (US); Nick Swerdlow, Santa Clara, CA (US); George John Thomas, Pleasanton, CA (US)

(73) Assignee: Zoom Communications, Inc., San Jose, CA (US)

( * ) Notice: Subject to any disclaimer, the term of this patent is extended or adjusted under 35 U.S.C. 154(b) by 51 days.

(21) Appl. No.: 18/585,823

(22) Filed: Feb. 23, 2024

(65) Prior Publication Data

US 2025/0274427 A1 Aug. 28, 2025

(51) Int. Cl.

| | |
|---|---|
| ***H04L 51/56*** | (2022.01) |
| ***G10L 15/18*** | (2013.01) |
| ***G10L 15/183*** | (2013.01) |
| ***G10L 15/30*** | (2013.01) |
| ***H04L 51/216*** | (2022.01) |

(52) U.S. Cl.

CPC .......... *H04L 51/56* (2022.05); *G10L 15/1815* (2013.01); *G10L 15/183* (2013.01); *G10L 15/30* (2013.01); *H04L 51/216* (2022.05)

(58) Field of Classification Search

None

See application file for complete search history.

(56) References Cited

U.S. PATENT DOCUMENTS

| | | | | |
|---|---|---|---|---|
| 2003/0105827 A1* | 6/2003 | Tan | G06Q 10/107 | 709/206 |
| 2005/0060643 A1* | 3/2005 | Glass | H04L 51/212 | 715/205 |
| 2008/0270560 A1* | 10/2008 | Tysowski | H04L 51/42 | 709/207 |
| 2012/0198002 A1* | 8/2012 | Goulart | H04L 51/56 | 709/206 |

(Continued)

FOREIGN PATENT DOCUMENTS

CN 116126510 A 5/2023

OTHER PUBLICATIONS

Official Gmail Blog, Email overload? Try Priority Inbox, https://gmail.googleblog.com/2010/08/email-overload-try-priority-inbox.html, Doug Aberdeen, Aug. 30, 2010, 4 pages.

(Continued)

*Primary Examiner* — Tonia L Dollinger
*Assistant Examiner* — Ishrat Rashid
(74) *Attorney, Agent, or Firm* — Young Basile Hanlon & MacFarlane, P.C.

(57) ABSTRACT

Transformer-based message prioritization is performed to determine one or more messages for a user of a unified communications system to prioritize. A server of a unified communication system determines one or more intents of a user. The one or more intents are represented in natural language. A transformer engine of the server obtains a set of messages of the user. The transformer engine determines relevance scores for one or more messages of the set of messages based on the one or more intents and natural language information of the one or more messages. The server causes display of at least a subset of the set of messages based on the relevance scores.

20 Claims, 8 Drawing Sheets

(56) References Cited

U.S. PATENT DOCUMENTS

| | | | | |
|---|---|---|---|---|
| 2016/0255034 | A1* | 9/2016 | Yuan | H04L 51/42 709/206 |
| 2017/0169013 | A1 | 6/2017 | Sarikaya et al. | |
| 2021/0074288 | A1* | 3/2021 | Stefanski | G06F 16/2471 |
| 2021/0210068 | A1* | 7/2021 | Zhang | G10L 15/07 |
| 2022/0321511 | A1* | 10/2022 | Hansmann | G06N 3/09 |
| 2022/0365993 | A1* | 11/2022 | Voisin | G06F 40/30 |

OTHER PUBLICATIONS

Lifehacker, Gmail's Priority Inbox Is Awesome. Just Give It a Chance, https://lifehacker.com/gmails-priority-inbox-is-awesome-just-give-it-a-chance-5992588, Whitson Gordon, Mar. 27, 2013, 10 pages.

Lifewire, How Gmail Marks Mail Important for the Priority Inbox, https://www.lifewire.com/how-to-mark-mail-important-for-priority-inbox-in-gmail-1171946, Heinz Tschabitscher, Mar. 13, 2021, 8 pages.

The Learning Behind Gmail Priority Inbox, https://static.googleusercontent.com/media/research.google.com/en//pubs/archive/36955.pdf, Douglas Aberdeen, Ondrej Pacovsky, Andrew Slater, retrieved from internet Feb. 22, 2024, 4 pages.

International Search Report and Written Opinion mailed on Jun. 10, 2025 in corresponding PCT Application No. PCT/US2025/016592.

* cited by examiner

TRANSFORMER-BASED MESSAGE PRIORITIZATION

FIELD

This disclosure generally relates to the use of artificial intelligence in communication systems. This disclosure relates to using a transformer-based architecture to prioritize or organize messages received by a user.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
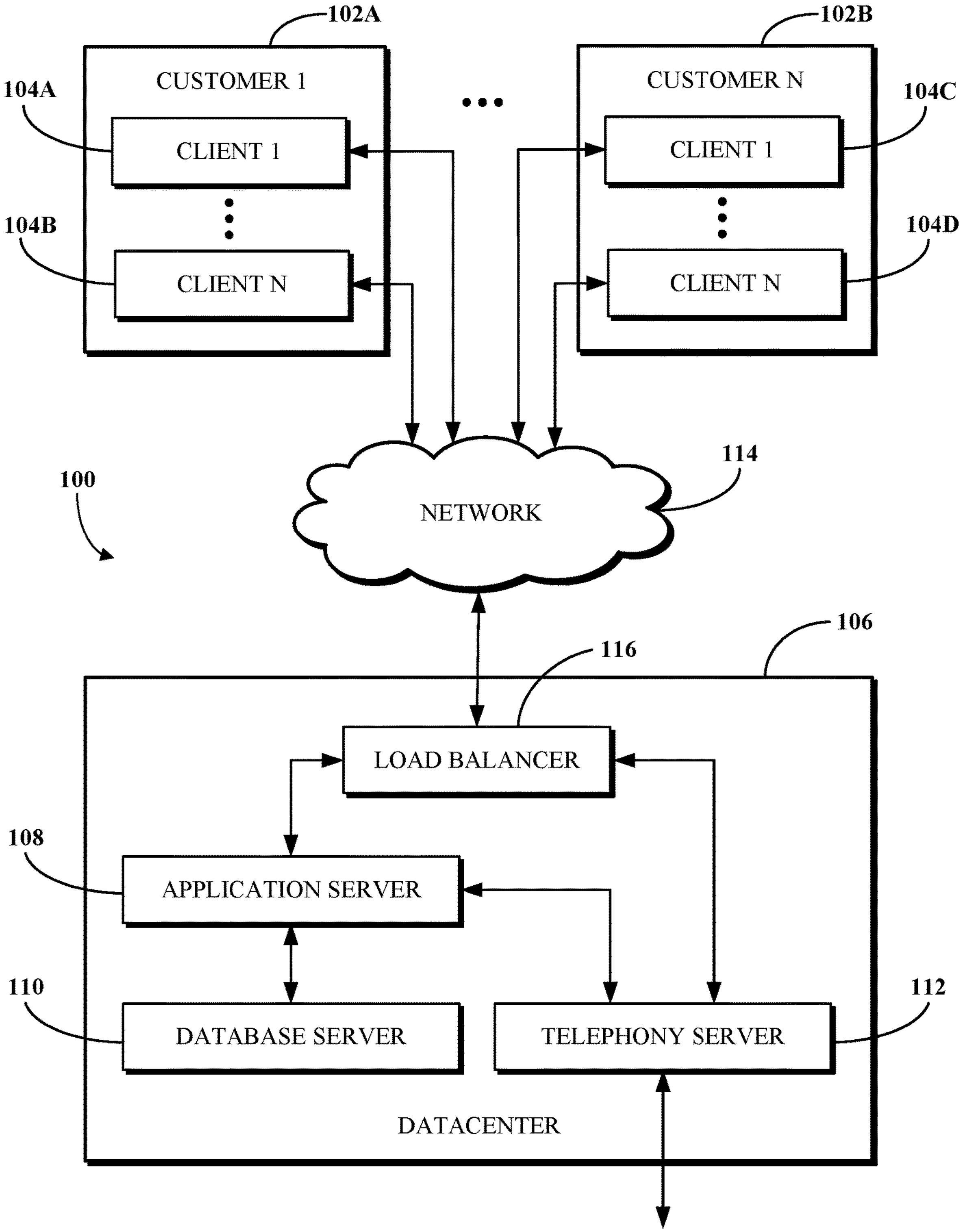
FIG. 1 is a block diagram of an example of an electronic computing and communications system.

A unified communication system, for example, a Unified Communications as a Service (UCaaS) system, may provide multiple communication modalities including, for example, email, voicemail, videomail, instant messaging, chat, audio messaging, short messaging service (SMS), multimedia messaging service (MMS), rich communication services (RCS), voice calling, video calling, and/or virtual reality (calling). A user of the unified communication system may spend a significant part of their day (e.g., multiple hours) processing their messages in the unified communication system, for example, reading their email, listening to their voicemail, or viewing their videomail. In some cases, this may include reading or listening to messages that are not relevant to the user's intents (e.g., projects on which they are working or the goals they are trying to achieve). This may be cumbersome for the user and may distract the user from more important or more urgent projects. Techniques for prioritizing messages based on the user's intents may thus be desirable.

Implementations of this disclosure address problems such as these using a transformer engine (e.g., a large language model (LLM) or a generative pretrained transformer (GPT)) executing at a server of a unified communication system that is capable of processing multiple messaging or communication modalities. The server determines one or more intents of a user of the unified communication system. The intents may correspond to interests of the user that the user prioritizes (or wishes to prioritize) and/or projects on which the user is working. In some implementations, the user provides an input of their intents. For example, a real estate agent may flag "counteroffer" or "purchase and sales" as intents that are relevant to the real estate agent and include messages that are to be processed quickly. Alternatively, the transformer engine of the server may determine the one or more intents based on obtained user activity data of the user within the unified communication system. For example, if the user often telephones a sender of a message that includes the term "counteroffer" (or a synonym thereof) and is a member of a stored set of clients of the user, the transformer engine might automatically create an intent "client counteroffer" for the user.

The transformer engine obtains a set of messages of the user. The set of messages may include at least one of voicemail messages, videomail messages, email messages, SMS messages, MMS messages, RCS messages, instant messages, video messages, social media messages, video messages, or push notifications. The transformer engine determines relevance scores for messages from the set based on the one or more intents and natural language information within the message. The server provides for display of a subset of the set of messages based on the determined relevance scores. For example, the messages in the set may be displayed in an order based on their relevance scores. Alternatively, the server may cause a client device of a user to alert the user whenever a message having a relevance score that exceeds a threshold is received, so that the user is able to process their most relevant messages quickly.

As used herein, the phrase "natural language" may include a language that is spoken or written by humans and that evolved naturally through its use by humans. A natural language may be distinct from a formal logical language or from a programming language. Examples of natural languages include, without limitation, at least one of English, French, Spanish, Chinese, Japanese, or Korean. A natural language may include a combination of two or more spoken or written languages (e.g., colloquially, Spanglish, which combines English words and Spanish words into a single phrase or sentence).

In some examples of the present disclosure, implementations may include or otherwise use one or more artificial intelligence or machine learning (collectively, AI/ML) systems having one or more models trained for one or more purposes. Use or inclusion of such AI/ML systems, such as for implementation of certain features or functions, may be turned off by default, where a user, an organization, or both must opt-in to utilize the features or functions that include or otherwise use an AI/ML system. User or organizational consent to use the AI/ML systems or features may be provided in one or more ways, for example, as explicit permission granted by a user prior to using an AI/ML feature, as administrative consent configured by administrator settings, or both. Users for whom such consent is obtained can be notified that they will be interacting with one or more AI/ML systems or features, for example, by an electronic message (e.g., delivered via a chat or email service or presented within a client application or webpage) or by an on-screen prompt, which can be applied on a per-interaction basis. Those users can also be provided with an easy way to withdraw their user consent, for example, using a form or like element provided within a client application, webpage, or on-screen prompt to allow individual users to opt-out of use of the AI/ML systems or features.

To enhance privacy and safety, as well as provide other benefits, the AI/ML processing system may be prevented from using a user's or organization's personal information (e.g., audio, video, chat, screen-sharing, attachments, or other communications-like content (such as poll results, whiteboards, or reactions)) to train any AI/ML models and instead only use the personal information for inference operations of the AI/ML processing system. Instead of using the personal information to train AI/ML models, AI/ML models may be trained using one or more commercially licensed data sets that do not contain the personal information of the user or organization.

Some implementations of the present disclosure involve obtaining and/or storing private data of users (e.g., instant messaging transcripts or call transcripts). It should be noted that affirmative consent of users is obtained for the storage of their private data, and users may withdraw consent at any time, in which case such data becomes purged. Furthermore, users are persistently notified (e.g., via on-screen icons or via email messages) that their data is being obtained and/or stored based on their previously-granted consent.

To describe some implementations in greater detail, reference is first made to examples of hardware and software structures used to implement transformer-based message prioritization. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
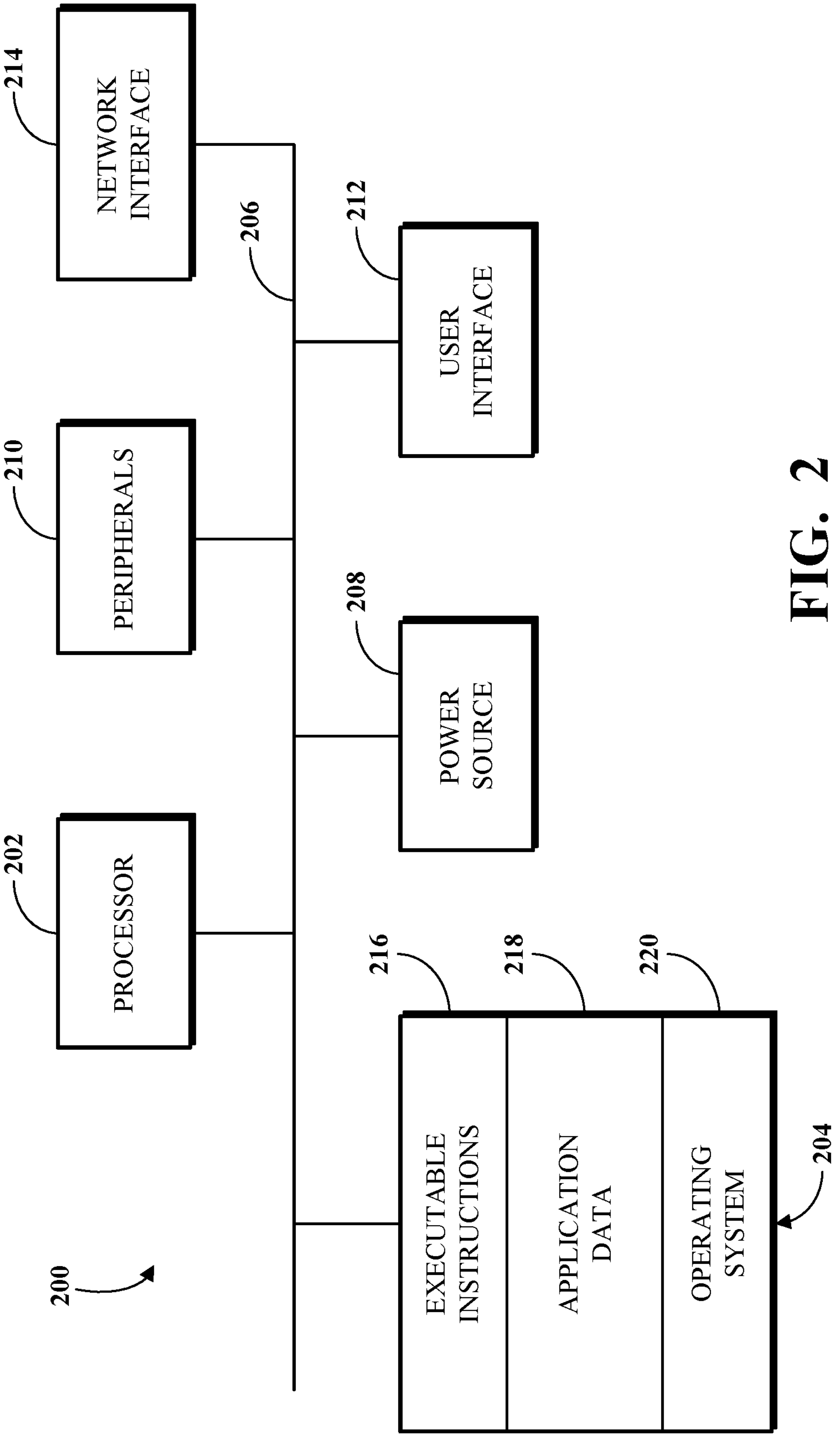
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
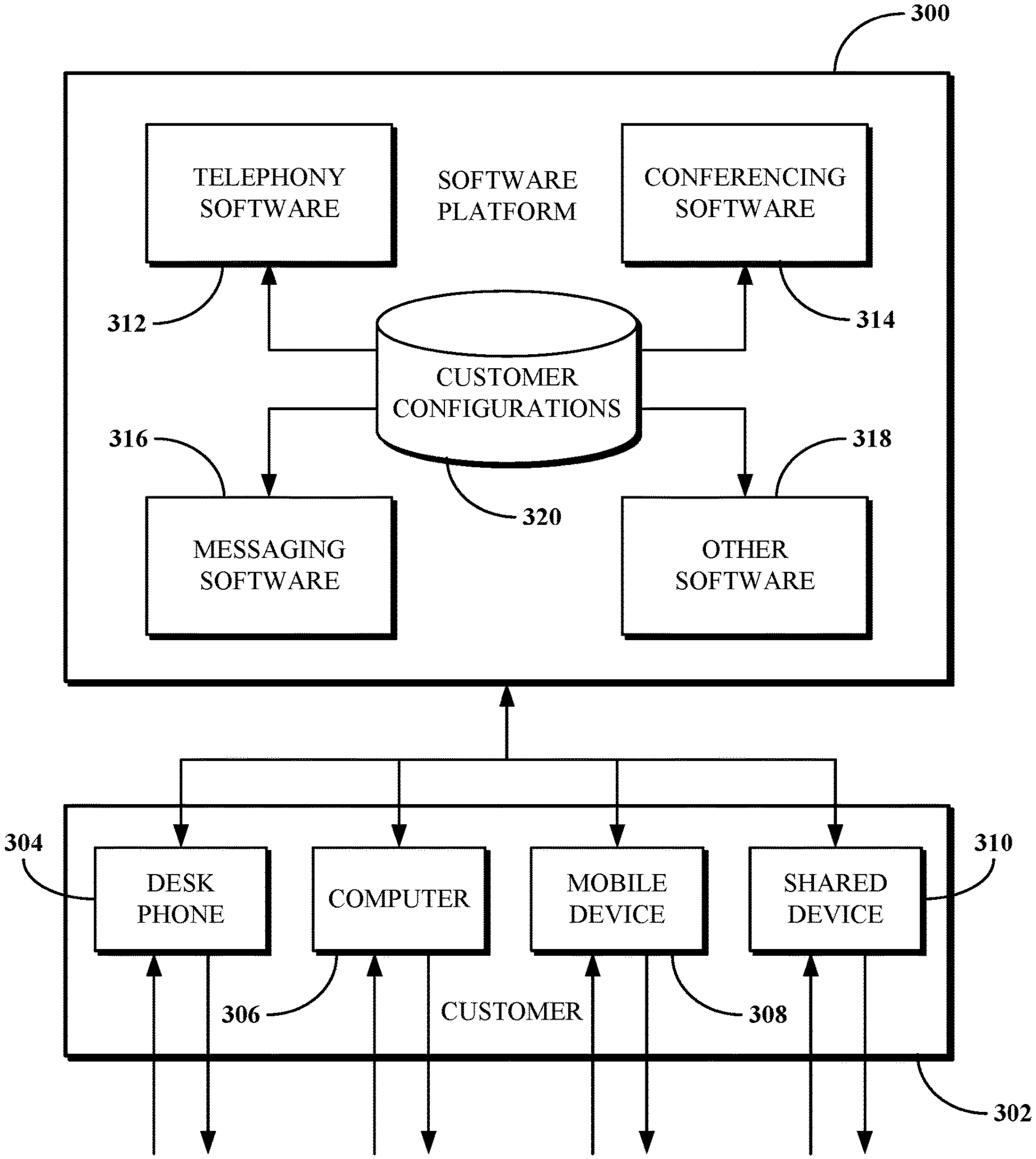
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients-a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients and other telephony-enabled devices, which may be other ones of the clients, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail or videomail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for transformer-based message prioritization. In some such cases, the other software 318 may accordingly interface with some or all of the software 312 through 316 and/or other communications-related software of the software platform 300.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
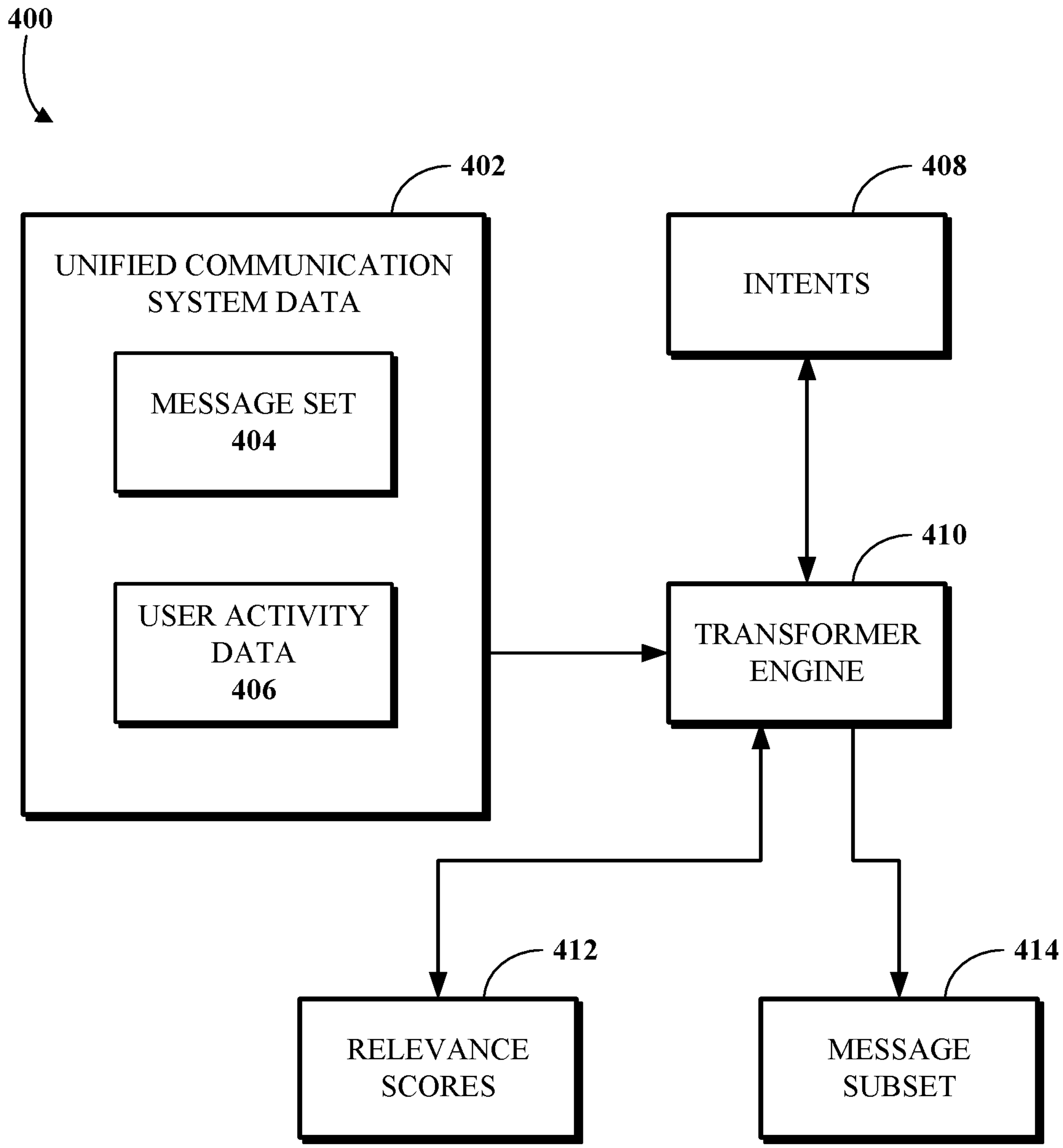
FIG. 4 is a block diagram of an example of a system for transformer-based message prioritization.

FIG. 4 is a block diagram of an example of a system 400 for transformer-based message prioritization. In some examples, the system 400 may be implemented at a server, for example, a server hosting all or a portion of the software platform 300. Alternatively, the system 400 may be implemented at a client device operated by a user, for example, the computer 306 or the mobile device 308.

As shown, the system 400 includes unified communication system data 402. The unified communication system data 402 may correspond to UCaaS data stored by a UCaaS system, for example, the software platform 300. As illustrated, the unified communication system data 402 includes a message set 404 and user activity data 406. The message set 404 may include at least one of voicemail messages, videomail messages, email messages, short messaging service messages, instant messages, video messages, social media messages, or push notifications. The message set 404 may include messages of a user of the system 400 and may be associated with one or more addresses of the user. The one or more addresses may include, for example, an email address, a messaging address (e.g., in a social media service or other service), a telephone number, or an account identifier. The message set 404 may include messages associated with asynchronous communication (e.g., email messages, SMS messages, social media messages, missed telephone calls, missed voice calls, or missed video calls) as opposed to synchronous communication (e.g., voice calls or video calls). The message set 404 may include at least one of unread messages, unviewed messages, or unplayed messages of a user. The messages set 404 may include messages that include text and/or audio in a natural language.

The user activity data 406 includes data of user activity stored by the unified communication system. The user activity data may include data of synchronous communications and asynchronous communications. The user activity data may include identifiers of other participants in a communication session and/or a transcript and/or a recording of the communication session. According to some examples, the user activity data 406 may include call detail records (CDRs). CDRs include information about telephone calls, voice calls, or video calls. A CDR may include at least one of a caller identifier (e.g., a telephone number or an account identifier), a recipient identifier (e.g., a telephone number or an account identifier), a start time of a call, an end time of a call, a duration of a call, a call status (e.g., connected, missed, voicemail, and/or videomail), or location data (e.g., approximate location data based on an area code or an IP address). The user activity data 406 may include transcripts of text-based instant messaging communications, such as individual chats or group chats. The user activity data 406 may include transcripts of voice or video-based communication sessions. The transcripts may be generated using artificial intelligence techniques, such as speech-to-text technology. The user activity data 406 may include usage analytics, for example, a number or a frequency of calls, conferences, or messages of the user, most frequently used communication channel(s) of the user, and duration of communication sessions.

Figure 7:
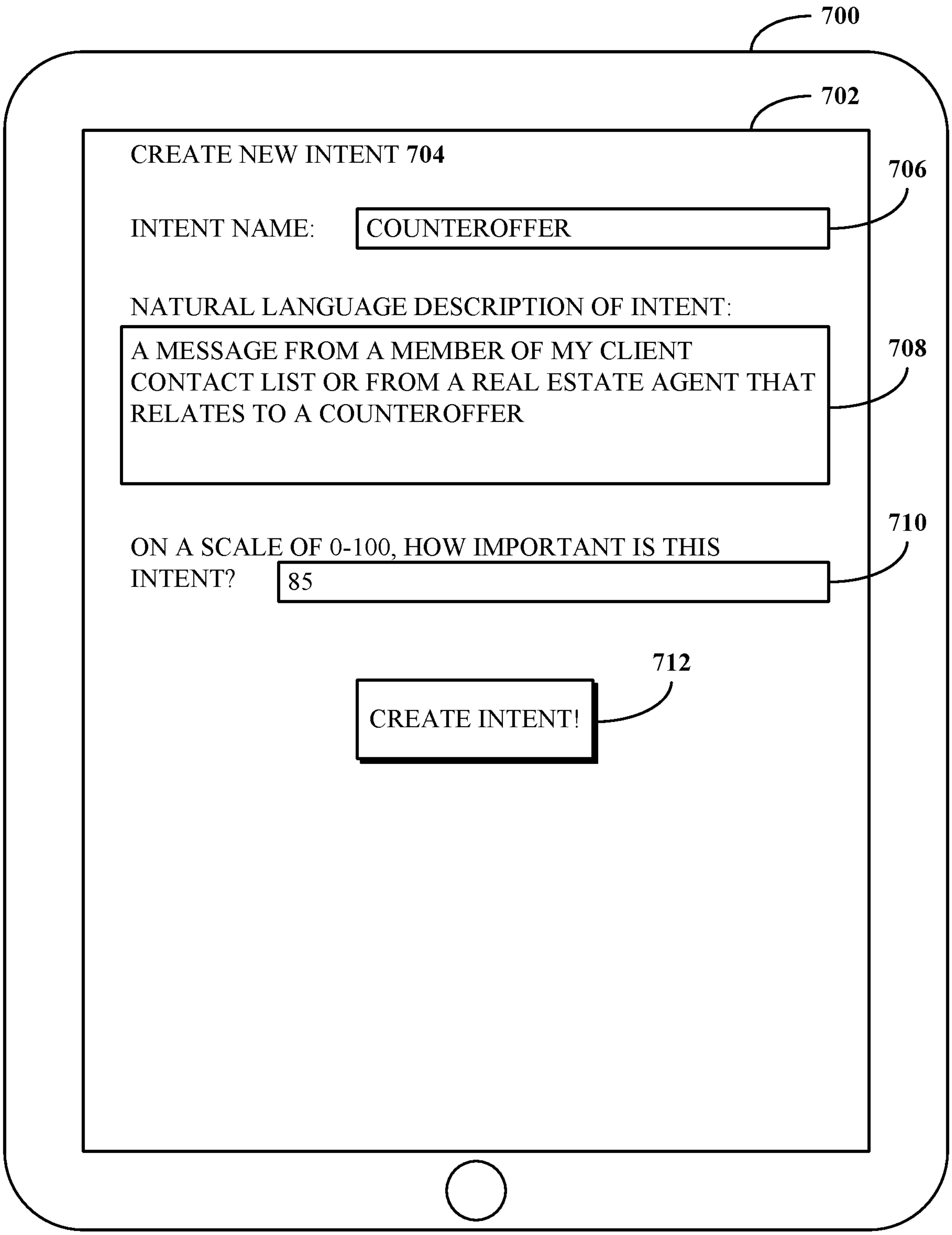
FIG. 7 illustrates a mobile device presenting a graphical user interface for creating an intent.

The system 400 further stores intents 408. The intents 408 may represent intentions, goals, priorities, projects, or interests of the user that are associated with messages to prioritize for the user (e.g., to present first in a list of messages for the user to review). The intents 408 may be expressed in natural language. Examples of intents include, without limitation: "counteroffer," "purchase and sales," "patent," or "artificial intelligence." In some cases, the intents 408 are manually entered by the user, for example, via a graphical user interface (GUI) (e.g., as illustrated in FIG. 7). The user may provide natural language text and/or natural language speech representing one or more of the intents 408. Alternatively or in addition, all or a portion of the intents 408 may be automatically determined based on the message set 404 and/or the user activity data 406 using software and/or hardware as described herein. For example, AI/ML techniques may be used to determine all or a portion of the intents 408, as described in greater detail below. Automatically determined intents may be presented to the user for their approval.

In some cases, each intent may be associated with an importance value, indicating how important the intent is for the user. The messages from the message set 404 that are presented to the user may be determined based on the importance value of the intents. For example, a message that loosely matches an intent with a high importance value may be presented before a message that more strongly matches an intent with a lower importance value.

In some cases, an intent of the intents 408 may include a sentiment. For example, a user might be interested in messages that are from clients (e.g., members of a stored client list) and that are associated with a specific sentiment (e.g., angry or upset). A user may specify an intent including, for example, "a message from a member of my client list who is angry." In some cases, an intent of the intents 408 may be based on a combination of content and a sentiment. For example, an intent may be associated with the content "counteroffer" and the sentiment "angry."

In some cases, an intent of the intents 408 may correspond to a project on which the user is working. The project of the user may be determined based on the user activity data 406 and/or the message set 404. For example, a boss of a user may transmit, to the user, an email message describing a project, and an intent may be identified based on that email (with the boss being identified based on organizational data of an organization using the unified communication system or based on the messages set 404 and/or the user activity data 406). For example, if the user frequently replies to or otherwise engages with messages (e.g., voicemail messages, videomail messages, chat messages, or SMS messages) related to marketing of yogurt to single men in their 20s, and the user received an email from their boss asking them to generate ideas about this topic, the transformer engine 410 may determine that "marketing of yogurt to single men in their 20s" is an intent of the user. In another example, the unified communication system data 402 may include notes or tasks of the user in an application for writing notes or storing task. The notes or tasks generated by the user or generated by others and shared with the user may correspond to projects on which the user is working. In yet another example, shared files (e.g., word processing files or spreadsheet files) that the user is reviewing or editing may correspond to projects of the user. The projects of the user could be mapped to intents of the user.

In some cases, an intent of the intents 408 may be associated with persons with whom the user works. For example, an associate at a law firm may create an intent for messages from partners of the law firm, or an intent for partners who are primarily responsible for assigning work to the associate. This might cause the associate to notice messages from those partners and/or to prioritize responding to them. In some cases, an intent of the intents 408 may be associated with communication addresses or users with which the user has communicated previously. For example, for the intent "counteroffer," it may be stated or implied that a counteroffer is responsive to an offer that was made previously and a message associated with the intent "counteroffer" is to relate to a previous communication about that previous offer.

As shown, the system 400 includes a transformer engine 410. The transformer engine 410 may include at least one of a LLM or a GPT. Alternatively or in addition, the transformer engine 410 may implement other AI/ML transformer technology.

The transformer engine 410 receives, as input, the unified communication system data 402 and any intents 408 manually entered by the user. In some cases, the transformer engine 410 generates additional intents 408 for the user based on the unified communication system data 402. The additional intents 408 may be generated, by the transformer engine 410, based on messages in the message set 404 the user responded to or marked as important, telephone, voice, or video calls the user accepted, telephone, voice, or video calls the user rejected, and/or message threads to which the user was added and in which the user participated. More details of this functionality of the transformer engine 410 are described below.

As further shown in FIG. 4, the transformer engine 410 determines relevance scores 412 of messages in the message set 404 to the intents 408. Based on the relevance scores 412, the transformer engine 410 determines a message subset 414 for display at a client device of the user. The relevance scores 412 for a given message-intent pair (where the message is from the message set 404 and the intent is from the intents 408) may be determined based on a match between tokens of the message and tokens of the intent, where a token represents a single unit of meaning. The token may correspond to a word, a part of a word (e.g., a prefix or a suffix) or a phrase including multiple words. The message subset 414 may include the n messages having the highest relevance score for each intent. In some cases, the value of n may be determined based on a screen size of the client device of the user or based on an amount of space on the screen of the client device provided for the display of the message subset 414.

Alternatively, a relevance score for each message may be determined based on a relevance score for the message for each intent and a prioritization of each intent. The prioritization may be manually entered by the user (e.g., as shown in FIG. 7 and described below) or may be determined by the transformer engine 410 based on the unified communication system data 402. For example, a user may assign a high prioritization to the intent "public disclosure date" and a low prioritization to the intent "artificial intelligence conference" to indicate that the user is more interested in messages related to "public disclosure date" than in messages related to "artificial intelligence conference."

In some cases, to determine the relevance scores 412 for message-intent pairs, the transformer engine 410 relies on at least one of tokenization, numerical representation, or contextual awareness. Tokenization breaks down the messages and the intents into tokens (e.g., a tokenized representation), where each token is a small, independent unit of meaning, and determines the relevance score based on a match of tokens in the message and the intent. In numerical representation, each token is assigned a numerical vector called an embedding. The embedding captures the semantic meaning of a token in relation to its context within a corpus of text (e.g., the entire intent or the entire message). In contextual awareness, the transformer-generated embeddings of at least one token (in the message and/or the intent) are dynamically adjusted based on the surrounding tokens, allowing the transformer engine to understand nuances and polysemy (words with multiple meanings).

In some cases, the transformer engine performs sentiment analysis on messages in the message set 404. The sentiment analysis may be used to determine relevance scores 412 of messages for intents 408 that include sentiment information. Sentiment analysis may be performed using the LLM and/or the GPT of the transformer engine, and the transformer engine may be trained to perform sentiment analysis using the techniques described below.

The transformer engine 410 may include a self-attention mechanism. The self-attention mechanism allows the transformer engine to examine all tokens in the message or the intent simultaneously, determining relationships between the tokens. The self-attention mechanism allows the transformer engine 410 to determine tokens that are most relevant to one another. For example, in a SMS message including the text, "I would like to submit a counteroffer to the buyer," attention would focus on the keywords-"submit," "counteroffer," and "buyer"

The transformer engine 410 may include a GPT engine. In some cases, the GPT engine that is trained using a two-phase process including the phases of pretraining and finetuning. In the pretraining phase, the GPT engine is trained on a dataset of publicly available (e.g., from the Internet) text or audio/video data that is converted into text using speech-to-text technology. The dataset of publicly available text may include text that is distinct from the unified communication system data 402. For example, the dataset of publicly available text may include at least one of newspaper articles, blog posts, publicly available social media post, or encyclopedia articles. The text is used to create a language model that learns to predict the next word in a sentence given the context of the previous words. The transformer architecture, specifically the self-attention mechanism, is used to capture dependencies between words and create a representation of the text.

During pretraining, the GPT engine learns to generalize the patterns it observes in the training data. Specifically, the GPT engine learns grammar, facts, reasoning abilities, and some level of world knowledge. The pretraining phase allows the GPT engine to acquire a broad understanding of the natural languages in which the GPT engine is trained.

During the finetuning phase, after pre-training, the GPT engine is further finetuned on specific tasks (e.g., identifying the intents 408, determining the relevance scores 412 for message-intent pairs, and selecting messages for the message subset 414) using labeled examples. The labeled examples may be publicly available message sets and user activity data or messages sets and user activity data that are manually generated by employees of a business providing or using UCaaS technology. The manually generated data is generated specifically for training the GPT engine and the users manually generating the data are aware of this planned use. The labeled examples may include labels of desired outputs that the GPT is to generate based on the inputs. For example, the labeled examples may include messages that are properly associated or not associated with a given intent. For example, the SMS message "I want to make a counteroffer," may be properly associated with the intent "counteroffer," while the SMS message, "Let's get coffee," may not be property associated with the intent "counteroffer." The finetuning phase makes the GPT engine useful for specific applications, such as identifying the intents 408, determining the relevance scores 412 for message-intent pairs, and selecting messages for the message subset 414. Finetuning involves training the GPT engine on a narrower dataset that may be generated with the help of human reviewers. Specifically, an entity associated with the finetuning process might hire human reviewers (e.g., members of a quality assurance department) to generate the narrower dataset based on their own activity (e.g., communicating with one another about fictitious projects). As a result, the entity does not rely on user data in training the GPT (or other AI/ML) technology.

The finetuning phase includes providing prompts or instructions to the GPT engine and receiving responses from the GPT engine. For example, a human reviewer may generate the message set 404 and the user activity data 406. The human reviewer then reviews the output generated by the GPT engine and score the output according to the various qualities (e.g., did the GPT engine identify useful intents 408 and properly calculate the relevance scores 412 for message-intent pairs). The GPT engine uses reinforcement learning to attempt to improve its scores on each (or at least a subset) of the qualities as the finetuning process progresses.

In summary, the system 400 (e.g., the server of the unified communication system or the client device storing messages) determines one or more intents 408 of the user. The system 400 provides the unified communication system data 402, including the message set 404 and the user activity data 406, to the transformer engine 410. The transformer engine 410 determines the relevance scores 412 for one or more messages from the message set 404 based on the one or more intents 408 and natural language information within the one or more messages. The transformer engine identifies a message subset 414 based on the relevance scores 412 and causes messages from the message subset 414 to be displayed to the user via the client device.

In one example use case, an accountant named Amy uses the disclosed technology to process her messages. Amy desires to prioritize messages associated with audits, so she creates an intent for “audit” using a user interface on her client device (e.g., as illustrated in FIG. 7). After receiving appropriate permissions from Amy and her employer, a server of the unified communication system tracks Amy's use of communication technology and determines that Amy frequently responds to messages that mention “Internal Revenue Service (IRS).” Thus, the server proposes a new intent for Amy called “IRS.” The “IRS” intent is transmitted to Amy (e.g., via email or via a push notification in a mobile application) for her approval, and Amy approves the IRS intent. In another example, the IRS intent may be suggested to Amy based on other intents that Amy created (e.g., the “audit” intent). The transformer engine 410 may determine (e.g., based on analyses of intents of other users) that users who have the “audit” intent also have the “IRS” intent and may suggest the “IRS” intent to Amy based on the “audit” intent that is already associated with Amy. The “IRS” intent may be suggested to a user who has the “audit” intent based on knowledge, of the transformer engine 410, that “audit” and “IRS” are related concepts.

As Amy receives new messages, (e.g., email messages, SMS messages, voicemail messages, videomail messages, chat messages, social media messages, tags in social media posts, or tags in a team chat channel) the new messages are scored based on their relevance to the “audit” and/or “IRS” tags. The messages with the highest scores are placed in the message subset 414 for presentation to Amy. When Amy views her messages, she may choose to view all of her unread messages, or to have the unread messages prioritized based on the “audit” and “IRS” intents. For example, Amy may open a unified messaging application to view all of her messages (e.g., email messages, SMS messages, voicemail messages, videomail messages, chat messages, social media messages, tags in social media posts, or tags in a team chat channel) arranged based on the relevance scores 412. Alternatively, Amy may choose to view only her email (or other communication medium) messages arranged based on the relevance score 412. Amy may also view her messages arranged in another order (e.g., by time of receipt or time of transmission).

In some implementations, the system 400 is implemented in a contact center, and the unified communication system data 402 correspond to Contact Center as a Service (CCaaS) data. The system 400 may thus correspond to a CCaaS server. For example, the system 400 may be used by a supervisor (e.g., a quality assurance reviewer) of the contact center to determine which messages from the message set 404 to review for quality assurance and/or training purposes. The supervisor may receive messages in the messages set 404 associated with contact center engagements conducted by their subordinates. For example, the message set 404 may include recordings or transcripts of contact center engagements (e.g., at least one of text-based engagements, audio engagements, video engagements, or telephone engagements) The supervisor may desire to review certain types of messages (e.g., messages relating to new products or services, or messages related to expansion in certain markets, which may be more important to the contact center for quality assurance or training purposes), messages associated with certain types of users (e.g., users located in certain geographic regions or users meeting target demographic criteria), or messages expressing certain sentiments (e.g., anger or sadness) and may enter the intents 408 associated with those types of messages. Alternatively, the intents 408 may be automatically determined, by the transformer engine 410, based on messages the supervisor reviewed. After the intents 408 are stored, the transformer engine 410 accesses the message set 404 to determine relevance scores 412 for the messages in the message set 404 and to identify the message subset 414 for presentation to the supervisor.

Figure 5:
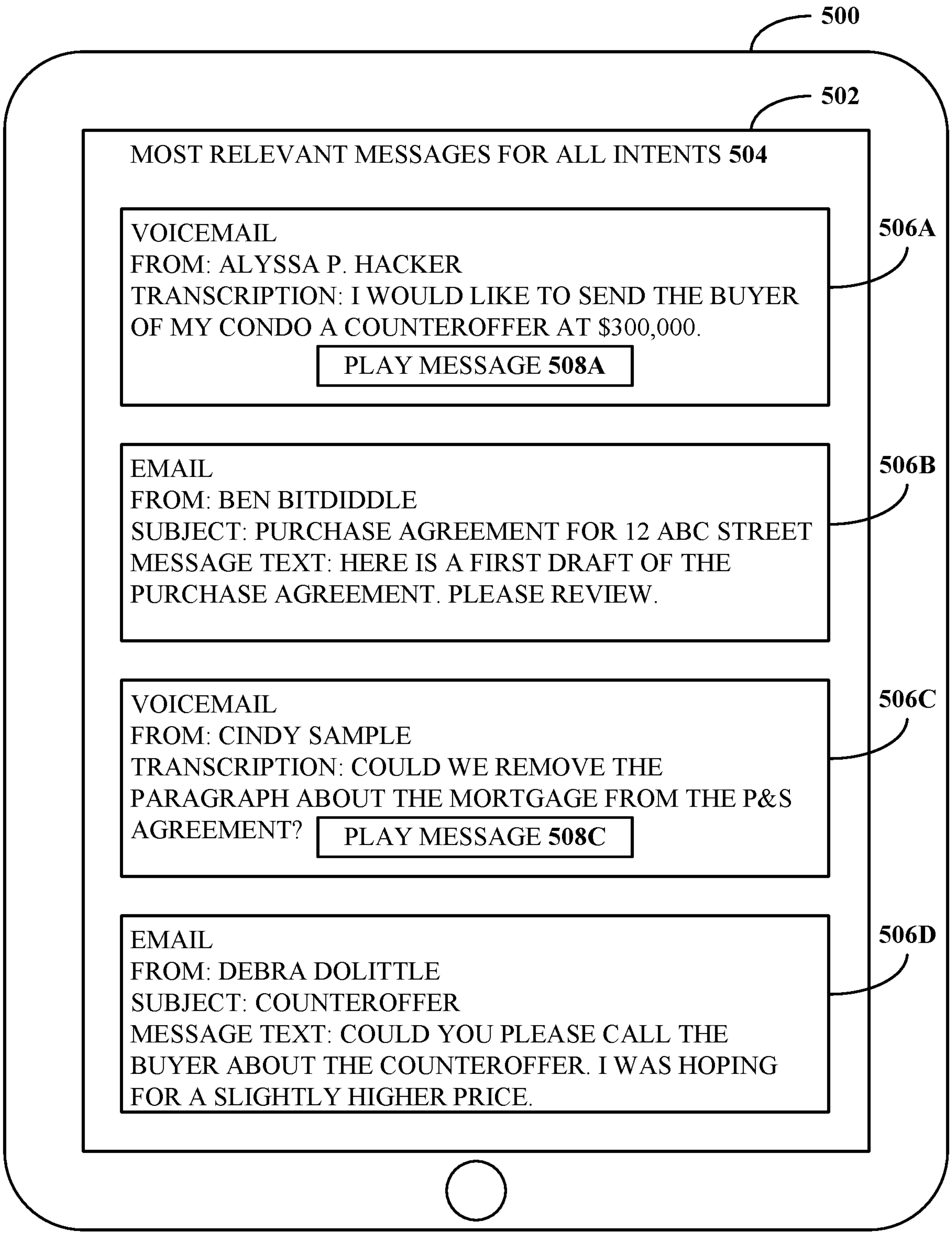
FIG. 5 illustrates a mobile device presenting a first graphical user interface for viewing a subset of messages.

FIG. 5 illustrates a mobile device 500 presenting a GUI for viewing a subset of messages. As shown, the mobile device 500 has a display 502 that displays a collection of messages 504. The collection of messages may correspond to the messages subset 414.

In conjunction with the GUI of the mobile device 500, the intents 408 include “counteroffer” and “purchase and sales agreement.” The messages displayed in the subset include messages 506A, 506B, 506C, and 506D. The message 506A is a voicemail about a counteroffer and includes a play message button 508A. The message 506B is an email about a purchase and sales agreement, and may be viewed by selecting the part of the display 502 including the message 506B. The message 506C is a voicemail about a purchase and sales (P&S) agreement and includes a play message button 508C. The message 506D is an email about a counteroffer, and may be viewed by selecting the part of the display 502 including the message 506D. The play message buttons 508A and 508C, when selected, cause the mobile device 500 to play the associated voicemail message.

Figure 6:
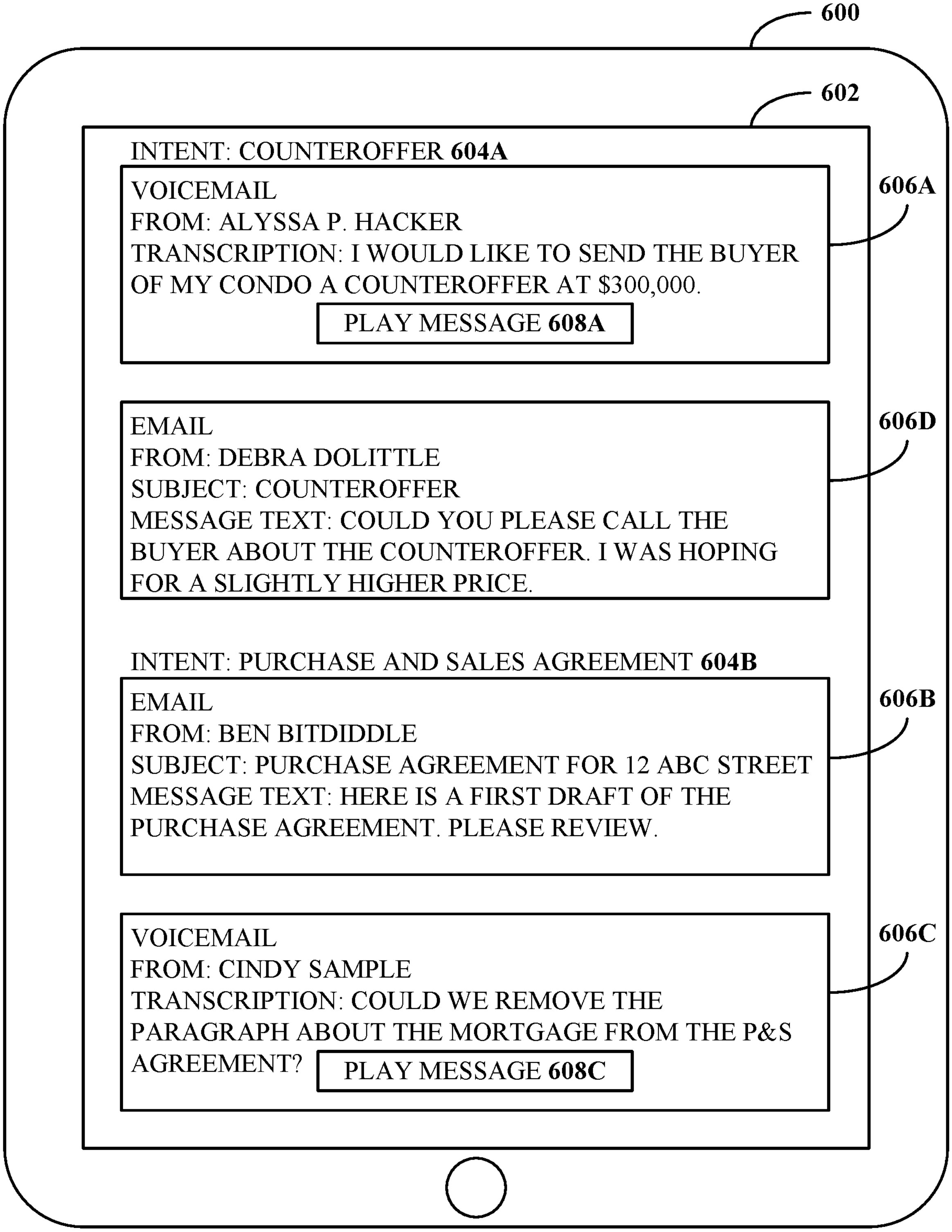
FIG. 6 illustrates a mobile device presenting a second graphical user interface for viewing a subset of messages.

FIG. 6 illustrates a mobile device 600 presenting a GUI for viewing a subset of messages. As shown, the mobile device 600 has a display 602 that displays two collections of messages, namely a collection 604A and a collection 604B. The collection 604A corresponds to the intent “counteroffer” and the collection 604B corresponds to the intent “purchase and sales agreement.” The intents “counteroffer” and “purchase and sales agreement” correspond to the intents 408 described in conjunction with FIG. 4.

In conjunction with the GUI of the mobile device 600, four messages 606A, 606B, 606C, and 606D are illustrated. These four messages 606A, 606B, 606C, and 606D correspond to the four messages 506A, 506B, 506C, 506D of FIG. 5. However, in FIG. 6, the messages are arranged in a different order with the messages 606A and 606D, associated with the intent "counteroffer," being placed in the collection 604A at the top of the display 602, and with the messages 606B and 606C, associated with the intent "purchase and sales agreement," being placed in the collection 604B at the bottom of the display 602. Also, similarly to FIG. 5, the voicemail message 606A is associated with a play message button 608A and the voicemail message 606C is associated with a play message button 608C. The play message buttons 608A and 608C, when selected, cause the mobile device 500 to play the associated voicemail message.

FIG. 5 and FIG. 6 illustrate the subset of messages being displayed at the client device of the user. In some implementations, messages from the set may be displayed and messages from the subset may be visually indicated (e.g., by highlighting or placing a symbol (e.g., an arrow) adjacent to messages from the subset. As a result, the user may be able to see all of the messages in the set, and may be able to have their attention focused on messages in the subset.

In some cases, messages associated with a given intent may be further prioritized (e.g., placed closer to the top or differently visually indicated (e.g., highlighted in a different color from other messages in the message subset 414)) based on the messages being from a given user. For example, if a real estate agent received five offers related to a home for sale, and is seriously negotiating with only one of the offerors, messages associated with that offeror may be indicated differently than other messages associated with the intent "counteroffer" in order to cause the real estate agent to notice and/or prioritize those messages.

Alternatively, the prioritization of other messages may be decreased and/or those messages might not be associated with the intent "counteroffer" in some circumstances. For example, once a given home is sold, additional counteroffers on that home might not be associated with the intent "counteroffer," as those counteroffers might not be useful to the real estate agent after the sale of the given home.

FIG. 7 illustrates a mobile device 700 presenting a GUI for creating an intent. As shown, the mobile device 700 has a display 702 that displays an interface 704 for creating an intent. The interface 704 includes an intent name input box 706, an intent description input box 708, an importance input box 710, and a create intent button 712.

The intent name input box 706 is used to enter a name for an intent, which may be one of the intents 408. As shown, the user entered the intent name "counteroffer." The intent description input box 708 allows the user to enter, using natural language text, a description of an intent. As shown, the user has entered, "a message from a member of my client contact list or from a real estate agent that relates to a counteroffer," in the intent description input box 708. The message relating to a counteroffer may be determined based on natural language information in the message. The message being from the member of the user's client contact list may be determined by comparing the sender of the message with a client contact list stored at the user's client device or at a server or data repository in association with the user's account. The message being from the real estate agent may be determined based on public social media information of the sender (e.g., whether the sender indicates that they are a real estate agent in their public social media profile or whether the sender is associated with a real estate agency, for example, by having an email address associated with a domain of a real estate agency).

In some cases, messages may be prioritized or associated with intents based on social media information of a sender of the message or other users associated with the messages (users copied on the message). For example, if a user has an intent for marketing a small local café, and the user receives an email message from a social media user with over 100,000 followers stating that the social media user enjoyed the food at the café, the email message from the social media user may be prioritized for the user and/or associated with the intent for marketing the small local café.

In some cases, after the user enters text in the intent description input box 708, the transformer engine 410 may expand on the input provided by the user in order to clarify the subject matter of the intent. The transformer engine 410 may use the unified communication system data 402, other intents 408 of the user, and/or anonymized data related to the intents 408 of other users to expand on the input. For example, the text entered by the user in the intent description input box may be expanded to: "a message from a member of my client contact list or from a real estate agent with whom I have communicated previously that relates to a counteroffer on a property where I represent the buyer or the seller that is still on the market." In the expanded intent, the transformer engine 410 may use publicly available data, for example, data of real estate websites, to determine if a property is still on the market. Alternatively, the transformer engine 410 may use internal data or data associated with a paid data repository (e.g., multiple listing service data) to which the user has access and to which the user grants access to the transformer engine 410.

The importance input box 710 allows the user to specify a numeric value for how important the intent is to the user. The user indicating a higher importance numeric value may cause the transformer engine 410 to include more messages associated with the intent or messages that are more weakly associated with the intent in the message subset 414, or to prioritize such messages higher than other messages in the message subset 414 (e.g., by placing them higher in a display of messages, as illustrated in FIG. 5 or FIG. 6). It should be noted that some implementations may lack the importance input box 710 and may assign an equal importance to all intents. Alternatively, the importance input box 710 may be replaced with a slider that may be moved to indicate the importance of an intent. In yet example, the importance input box 710 may be replaced with a user interface for creating a stack or a ranked list of intents in order of importance to the user.

The create intent button 712, when selected, causes an intent to be created based on the information entered by the user in the intent name input box 706, the intent description input box 708, and/or the importance input box 710. The intent may be stored among the intents 408. The intent may be used to select messages for the message subset 414, for example, as described in conjunction with FIG. 8.

Figure 8:
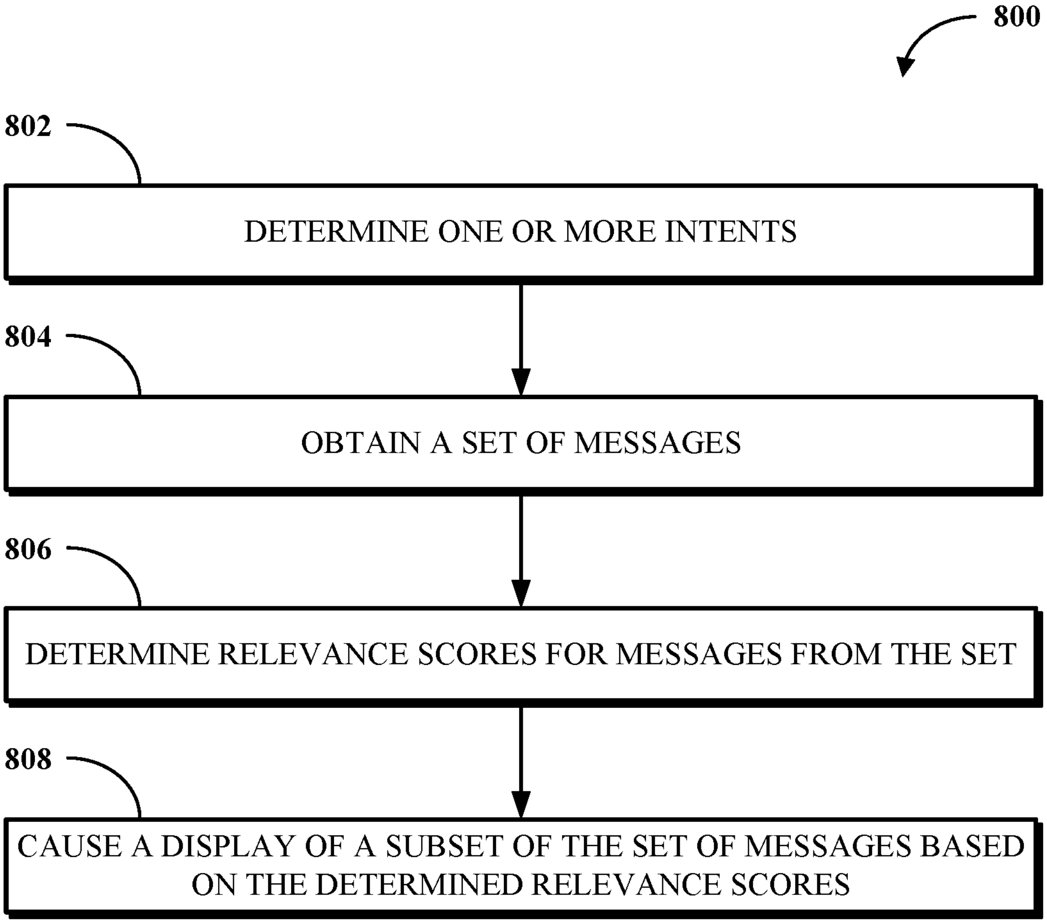
FIG. 8 is a flowchart of an example of a technique for transformer-based message prioritization.

To further describe some implementations in greater detail, reference is next made to examples of techniques for message prioritization. FIG. 8 is a flowchart of an example of a technique 800 for transformer-based message prioritization. The technique 800 can be executed using computing devices, such as the systems, hardware, and software described with respect to FIGS. 1-7. The technique 800 can be performed, for example, by executing a machine-readable program or other computer-executable instructions, such as routines, instructions, programs, or other code. The steps, or operations, of the technique 800 or another technique, method, process, or algorithm described in connection with the implementations disclosed herein can be implemented directly in hardware, firmware, software executed by hardware, circuitry, or a combination thereof.

For simplicity of explanation, the technique 800 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 802, a server of a unified communication system (e.g., a UCaaS system) determines one or more intents (e.g., the intents 408) of a user. The one or more intents are represented in natural language. The user may manually enter at least one of the intents, for example, using the GUI shown in FIG. 7. Specifically, the server may receive, from a client device of the user (e.g., a client device associated with an account of the user), a user input representing at least one of the intents. The user input may include at least one of natural language text or natural language speech.

Alternatively, the intents may be determined, by the server, based on records of synchronous communications (e.g., real-time communications, for example, at least one of telephone calls, voice calls, video calls, voice conferences, or video conferences) or records of asynchronous communications stored by the unified communication system. For example, a transformer engine (e.g., the transformer engine 410) of the server obtains user activity data with respect to the set of messages and determines the one or more intents based on the obtained user activity data. User activity data may include at least one of reading messages, writing messages, participating in synchronous communications, initiating synchronous communications, or rejecting proposed synchronous communications. In another example, the server obtains user activity data with respect to synchronous communications processed by the unified communication system. The server determines at least a portion of the intents based on the obtained user activity data.

At 804, the transformer engine obtains a set of messages (e.g., the message set 404) of the user. The set of messages may include natural language messages in an asynchronous communication modality (e.g., at least one of email, SMS, voicemail, or videomail). In some implementations, the set of messages includes voicemail messages or videomail messages. The disclosed technology may be useful for voicemail messages or videomail messages because, while humans can process multiple pieces of visual data in parallel, humans cannot process multiple pieces of audio data (e.g., voicemail recordings) or video data (e.g., videomail recordings) in parallel. Thus, for power users of voicemail or videomail who receive multiple voicemail messages and/or videomail messages, determining which voicemail messages or videomail messages to play first may be particularly useful.

At 806, the transformer engine determines relevance scores (e.g., the relevance scores 412) for one or more messages from the set of messages based on the one or more intents and natural language information within the one or more messages. A relevance score for a message-intent pair represents how likely the message is to correspond to the intent (e.g., a likelihood that the message corresponds to the intent). The relevance score may be represented as at least one of a probability, a percentage, or another type of score.

At 808, the server causes the client device of the user to display at least a subset (e.g., the message subset 414) of the set of messages based on the determined relevance scores. For example, n messages having the highest relevance scores may be displayed, where n is a positive integer. Alternatively, m messages having the highest relevance score for a given intent may be displayed, where m is a positive integer. The displayed information may correspond to the GUIs shown in FIGS. 5-6.

Some implementations relate to determining intents of a user, for example, per 802. In some implementations, the server determines a first set of intents based on synchronous communications of the user via the unified communication system, and the server determines a second set of intents based on asynchronous communications of the user via the unified communication system. In some implementations, the server determines a first set of intents based on communications in a first asynchronous communication modality of the user via the unified communication system, and the server determines a second set of intents based on communications in a second asynchronous communication modality of the user via the unified communication system. In some implementations, the server determines a first set of intents based on communications in a private communication modality of the user via the unified communication system, and the server determines a second set of intents based on communications in a group communication modality of the user via the unified communication system. In some implementations, the server determines the one or more intents based on a frequency of use of a given communication modality of the user via the unified communication system. In some implementations, the server determines the one or more intents based on a frequency of use of a given communication modality of the user via the unified communication system.

In some implementations, the server determines the one or more intents based on receipt of a communication over a first modality while the user is participating in a communication over a second modality. In an example use case, the user could be in a telephone call with a counterparty discussing a purchase and sales agreement (the transformer engine may determine what is being discussed by applying LLM or GPT technology to a transcript of the telephone call that is generated in real-time). During the telephone call, the counterparty sends an email with the subject "purchase and sales agreement." Based on the simultaneous discussion and email, the server may determine that "purchase and sales agreement" is an intent of the user.

In some implementations, a message may be associated with an intent based on the message being received simultaneously with a synchronous communication related to the intent and being from another party in that communication. In an example use case, if during a telephone call discussing a purchase and sales agreement, the other party on the telephone call sends a photograph via multimedia messaging (MMS), the MMS message including the photograph may be associated with the intent "purchase and sales agreement," and the relevance score for the association of the MMS message with the intent "purchase and sales agreement" may be determined based on application of LLM or GPT technology to the recording or transcript of the telephone call.

Some implementations are described below as numbered examples (Example 1, 2, 3, etc.). These examples are provided as examples only and do not limit the other implementations disclosed herein.

Example 1 is a method, comprising: determining, by a server of a unified communication system, one or more intents of a user, the one or more intents being represented in natural language; obtaining, by a transformer engine of the server, a set of messages of the user; determining, by the transformer engine, relevance scores for one or more messages of the set of messages based on the one or more intents and natural language information of the one or more messages; and causing, by the server, display of at least a subset of the set of messages based on the relevance scores.

In Example 2, the subject matter of Example 1 includes, wherein the set of messages comprises at least one of voicemail messages or videomail messages.

In Example 3, the subject matter of Examples 1-2 includes, wherein the set of messages comprises at least one of email messages, short messaging service messages, instant messages, social media messages, video messages, or push notifications.

In Example 4, the subject matter of Examples 1-3 includes, wherein determining the one or more intents comprises: receiving, by the server, a user input representing the one or more intents, the user input comprising at least one of natural language text or natural language speech.

In Example 5, the subject matter of Examples 1-4 includes, wherein determining the one or more intents comprises: obtaining, by the transformer engine, user activity data with respect to the set of messages; and determining, by the transformer engine, the one or more intents based on the user activity data.

In Example 6, the subject matter of Examples 1-5 includes, wherein determining the one or more intents comprises: obtaining, by the transformer engine, user activity data with respect to real-time communications processed by the unified communication system; and determining, by the transformer engine, the one or more intents based on the user activity data.

In Example 7, the subject matter of Examples 1-6 includes, wherein the transformer engine comprises at least one of a large language model or a generative pretrained transformer.

In Example 8, the subject matter of Examples 1-7 includes, wherein determining the one or more intents comprises: determining, by the transformer engine, a first set of intents based on synchronous communications of the user via the unified communication system; and determining, by the transformer engine, a second set of intents based on asynchronous communications of the user via the unified communication system.

In Example 9, the subject matter of Examples 1-8 includes, wherein determining the one or more intents comprises: determining, by the transformer engine, a first set of intents based on communications in a first synchronous communication modality of the user via the unified communication system; and determining, by the transformer engine, a second set of intents based on communications in a second synchronous communication modality of the user via the unified communication system.

In Example 10, the subject matter of Examples 1-9 includes, wherein determining the one or more intents comprises: determining, by the transformer engine, a first set of intents based on communications in a first asynchronous communication modality of the user via the unified communication system; and determining, by the transformer engine, a second set of intents based on communications in a second asynchronous communication modality of the user via the unified communication system.

In Example 11, the subject matter of Examples 1-10 includes, wherein determining the one or more intents comprises: determining, by the transformer engine, a first set of intents based on communications in a private communication modality of the user via the unified communication system; and determining, by the transformer engine, a second set of intents based on communications in a group communication modality of the user via the unified communication system.

In Example 12, the subject matter of Examples 1-11 includes, wherein determining the one or more intents comprises: determining, by the transformer engine, the one or more intents based on a frequency of use of a given communication modality of the user via the unified communication system.

In Example 13, the subject matter of Examples 1-12 includes, wherein determining the one or more intents comprises: determining, by the transformer engine, the one or more intents based on a frequency of use of a given communication modality of the user via the unified communication system.

In Example 14, the subject matter of Examples 1-13 includes, wherein determining the one or more intents comprises: determining, by the transformer engine, the one or more intents based on receipt of a communication over a first modality while the user is participating in a communication over a second modality.

In Example 15, the subject matter of Examples 1-14 includes, wherein the server of the unified communication system comprises a Contact Center as a Service server, wherein the set of messages comprises recordings or transcripts of contact center engagements, wherein the one or more intents are associated with at least one of quality assurance or training.

Example 16 is a computer readable medium storing instructions operable to cause one or more processors to perform operations comprising: determining, by a server of a unified communication system, one or more intents of a user, the one or more intents being represented in natural language; obtaining, by a transformer engine of the server, a set of messages of the user; determining, by the transformer engine, relevance scores for one or more messages of the set of messages based on the one or more intents and natural language information of the one or more messages; and causing, by the server, display of at least a subset of the set of messages based on the determined relevance scores.

In Example 17, the subject matter of Example 16 includes, wherein the set of messages comprises at least one of voicemail messages, videomail messages, email messages, short messaging service messages, instant messages, social media messages, or video messages.

In Example 18, the subject matter of Examples 16-17 includes, wherein determining the one or more intents comprises: receiving, by the server, a user input representing the one or more intents, the user input comprising natural language data.

Example 19 is a system, comprising: a memory subsystem; and processing circuitry configured to execute instructions stored in the memory subsystem to: determine, by a server of a unified communication system, one or more intents of a user, the one or more intents being represented in natural language; obtain, by a transformer engine of the server, a set of messages of the user; determine, by the transformer engine, relevance scores for one or more messages of the set of messages based on the one or more intents and natural language information of the one or more messages; and cause, by the server, display of at least a subset of the set of messages based on the relevance scores.

In Example 20, the subject matter of Example 19 includes, wherein determining the one or more intents comprises: obtaining, by the server, user activity data with respect to the set of messages; and determining, by the server, the one or more intents based on the obtained user activity data.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

As used herein, unless explicitly stated otherwise, any term specified in the singular may include its plural version. For example, "a computer that stores data and runs software," may include a single computer that stores data and runs software or two computers-a first computer that stores data and a second computer that runs software. Also "a computer that stores data and runs software," may include multiple computers that together stored data and run software. At least one of the multiple computers stores data, and at least one of the multiple computers runs software.

As used herein, the term "computer-readable medium" encompasses one or more computer readable media. A computer-readable medium may include any storage unit (or multiple storage units) that store data or instructions that are readable by processing circuitry. A computer-readable medium may include, for example, at least one of a data repository, a data storage unit, a computer memory, a hard drive, a disk, or a random access memory. A computer-readable medium may include a single computer-readable medium or multiple computer-readable media. A computer-readable medium may be a transitory computer-readable medium or a non-transitory computer-readable medium.

As used herein, the term "memory subsystem" includes one or more memories, where each memory may be a computer-readable medium. A memory subsystem may encompass memory hardware units (e.g., a hard drive or a disk) that store data or instructions in software form. Alternatively or in addition, the memory subsystem may include data or instructions that are hard-wired into processing circuitry.

As used herein, processing circuitry includes one or more processors. The one or more processors may be arranged in one or more processing units, for example, a central processing unit (CPU), a graphics processing unit (GPU), or a combination of at least one of a CPU or a GPU.

As used herein, the term "engine" may include software, hardware, or a combination of software and hardware. An engine may be implemented using software stored in the memory subsystem. Alternatively, an engine may be hard-wired into processing circuitry. In some cases, an engine includes a combination of software stored in the memory subsystem and hardware that is hard-wired into the processing circuitry.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:

determining, by a server of a unified communication system, a natural language representation of one or more intents of a user, the one or more intents determined based on data of user activity stored by the unified communication system, the one or more intents representing at least one of intentions, goals, priorities, projects, or interests of the user;

obtaining, by a transformer engine of the server, unified communication system data comprising a set of messages associated with one or more addresses of the user;

identifying, by the transformer engine, message-intent pairs, each message-intent pair comprising a message from the set of messages and an intent from the one or more intents;

applying, by the transformer engine, tokenization to the natural language representation of the one or more intents to obtain tokens of the intent; and applying, by the transformer engine, tokenization to the set of messages to obtain tokens of the message;

determining, by the transformer engine, relevance scores for message-intent pairs based on a match between the tokens of the message and the tokens of the intent, wherein each of the relevance scores represents a likelihood that the message from the set of messages corresponds to the intent from the one or more intents;

selecting, by the server, a subset of messages based on the relevance scores for the message-intent pairs, wherein the subset of messages includes n messages from the set of messages having highest ones of the relevance scores for a selected intent from the one or more intents, and n is a positive integer; and causing, by the server, display of the subset of messages to the user in a graphical user interface associated with the unified communication system.

2. The method of claim 1, wherein the set of messages comprises at least one of voicemail messages, videomail messages, email messages, short messaging service messages, instant messages, social media messages, video messages, or push notifications.

3. The method of claim 1, wherein determining the one or more intents comprises:

receiving, by the server, a user input representing the one or more intents, the user input comprising at least one of natural language text or natural language speech.

4. The method of claim 1, wherein the data of user activity comprises user activity with respect to the set of messages and determining the one or more intents comprises determining the one or more intents based on the data of user activity with respect to the set of messages.

5. The method of claim 1, wherein the data of user activity comprises data of synchronous communications and asynchronous communications processed by the unified communication system, and determining the one or more intents comprises determining the one or more intents based on the data of synchronous communications and asynchronous communications processed by the unified communication system.

6. The method of claim 1, wherein the transformer engine comprises at least one of a large language model or a generative pretrained transformer.

7. The method of claim 1, wherein determining the one or more intents comprises:

determining, by the transformer engine, a first set of intents based on synchronous communications of the user via the unified communication system;

determining, by the transformer engine, a second set of intents based on asynchronous communications of the user via the unified communication system; and combining, by the transformer engine, the first set of intents and the second set of intents for use together in determining the relevance scores for the message-intent pairs.

8. The method of claim 1, wherein determining the one or more intents comprises:

determining, by the transformer engine, a first set of intents based on communications in a first asynchronous communication modality of the user via the unified communication system;

determining, by the transformer engine, a second set of intents based on communications in a second asynchronous communication modality of the user via the unified communication system; and combining the first set of intents and the second set of intents for use together in determining the relevance scores for the message-intent pairs.

9. The method of claim 1, wherein determining the one or more intents comprises:

determining, by the transformer engine, a first set of intents based on communications in a private communication modality of the user via the unified communication system;

determining, by the transformer engine, a second set of intents based on communications in a group communication modality of the user via the unified communication system; and combining the first set of intents and the second set of intents for use together in determining the relevance scores for the message-intent pairs.

10. The method of claim 1, wherein determining the one or more intents comprises:

determining, by the transformer engine, the one or more intents based on a relationship between a first communication and a second communication, wherein the first communication is received over a first modality while the user is participating in the second communication over a second modality.

11. The method of claim 1, wherein the server of the unified communication system comprises a Contact Center as a Service server, wherein the set of messages comprises recordings or transcripts of contact center engagements, wherein the one or more intents are associated with at least one of quality assurance or training.

12. The method of claim 1, wherein determining the relevance scores for a specific one of the message-intent pairs comprises identifying, by the transformer engine, one or more tokens of a respective message from the specific one of the message-intent pairs that are most relevant to one or more tokens of a respective intent from the specific one of the message-intent pairs, and using the identified tokens in determining the relevance score for the specific one of the message-intent pairs.

13. The method of claim 1, wherein determining the relevance scores for a specific one of the message-intent pairs comprises using, by the transformer engine, an embedding vector for tokens of a respective message from the specific one of the message-intent pairs and an embedding vector for tokens of a respective intent from the specific one of the message-intent pairs in determining the relevance score for the specific one of the message-intent pairs.

14. The method of claim 1, wherein determining the relevance scores for a specific one of the message-intent pairs comprises applying, by the transformer engine, a self-attention mechanism to tokens of a respective message from the specific one of the message-intent pairs and tokens of a respective intent from the specific one of the message-intent pairs to determine tokens that are most relevant.

15. The method of claim 1, wherein determining the one or more intents comprises expanding, by the transformer engine, natural language text entered by the user in order to clarify a subject matter of the intent.

16. The method of claim 15, wherein expanding the natural language text entered by the user comprises using the set of messages and the data of user activity in expanding the natural language text.

17. A non-transitory computer-readable medium storing instructions operable to cause one or more processors to perform operations comprising:

determining, by a server of a unified communication system, a natural language representation of one or more intents of a user, the one or more intents determined based on data of user activity stored by the unified communication system, the one or more intents representing at least one of intentions, goals, priorities, projects, or interests of the user;

obtaining, by a transformer engine of the server, unified communication system data comprising a set of messages associated with one or more addresses of the user;

identifying, by the transformer engine, message-intent pairs, each message-intent pair comprising a message from the set of messages and an intent from the one or more intents;

applying, by the transformer engine, tokenization to the natural language representation of the one or more intents to obtain tokens of the intent; and applying, by the transformer engine, tokenization to the set of messages to obtain tokens of the message;

determining, by the transformer engine, relevance scores for message-intent pairs based on a match between tokens of the message and tokens of the intent, wherein each of the relevance scores represents a likelihood that the message from the set of messages corresponds to the intent from the one or more intents;

selecting, by the server, a subset of messages based on the relevance scores for the message-intent pairs, wherein the subset of messages includes n messages from the set of messages having highest ones of the relevance scores for a selected intent from the one or more intents, and n is a positive integer; and causing, by the server, display of the subset of messages to the user in a graphical user interface associated with the unified communication system.

18. The non-transitory computer-readable medium of claim 17, wherein the set of messages comprises at least one of voicemail messages, videomail messages, email messages, short messaging service messages, instant messages, social media messages, or video messages.

19. The non-transitory computer-readable medium of claim 17, wherein determining the one or more intents comprises:

receiving, by the server, a user input representing the one or more intents, the user input comprising natural language data.

20. A system, comprising:

a memory subsystem; and processing circuitry configured to execute instructions stored in the memory subsystem to:

determine, in a unified communication system, a natural language representation of one or more intents of a user, the one or more intents determined based on data of user activity stored by the unified communication system, the one or more intents representing at least one of intentions, goals, priorities, projects, or interests of the user;

obtain, by a transformer engine, unified communication system data comprising a set of messages associated with one or more addresses of the user;

identify, by the transformer engine, message-intent pairs, each message-intent pair comprising a message from the set of messages and an intent from the one or more intents;

apply, by the transformer engine, tokenization to the natural language representation of the one or more intents to obtain tokens of the intent; and apply, by the transformer engine, tokenization to the set of messages to obtain tokens of the message;

determine, by the transformer engine, relevance scores for message-intent pairs based on a match between the tokens of the message and the tokens of the intent, wherein each of the relevance scores represents a likelihood that the message from the set of messages corresponds to the intent from the one or more intents;

select a subset of messages based on the relevance scores for the message-intent pairs, wherein the subset of messages includes n messages from the set of messages having highest ones of the relevance scores for a selected intent from the one or more intents, and n is a positive integer; and cause display of the subset of messages to the user in a graphical user interface associated with the unified communication system.

* * * * *